United States Patent [19]

Siebel et al.

[11] 3,909,546

[45] Sept. 30, 1975

[54] ARRANGEMENT FOR CONNECTING EXCHANGE LINES TO SWITCHBOARDS IN TELEPHONE SYSTEMS

[75] Inventors: Hans-Dieter Siebel, Munchingen; Hermann Schlund, Bissingen, both of Germany

[73] Assignee: International Standard Electric Corporation, New York, N.Y.

[22] Filed: May 14, 1973

[21] Appl. No.: 359,993

Related U.S. Application Data

[63] Continuation of Ser. No. 110,161, Jan. 27, 1971, abandoned.

[52] U.S. Cl. .......................................... 179/27 FA

[51] Int. Cl.[2] .......................................... H04M 3/60

[58] Field of Search .......... 179/27 FA, 27 FF, 27 B, 179/27 FH, 27 D, 18 GE, 18 AA

[56] References Cited

UNITED STATES PATENTS

| | | | |
|---|---|---|---|
| 2,922,847 | 1/1960 | Dunning | 179/27 D |
| 3,129,293 | 4/1964 | Warman | 179/22 |
| 3,201,522 | 8/1965 | Ozenberger | 179/27 D |
| 3,539,733 | 11/1970 | Morris et al. | 179/27 FF |
| 3,637,947 | 1/1972 | Breen | 179/27 FH |

*Primary Examiner*—Thomas W. Brown

*Attorney, Agent, or Firm*—J. B. Raden; D. P. Warner

[57] ABSTRACT

The complexity and cost of the switching grid used for connecting m exchange links to *n* switchboards can be reduced if it is formed by a main matrix with *m. n* crosspoint relays each having many contacts required for supervising the conditions of the exchange links, and by an auxiliary matrix with *m . n . p* crosspoint relays each having few contacts required for the assignment of an exchange link to the switchboard, with *p* giving the number of interrogating elements. Further features are concerned with the transfer of trunk calls by switchboards to a special switchboard.

2 Claims, 4 Drawing Figures

Figure 1A:
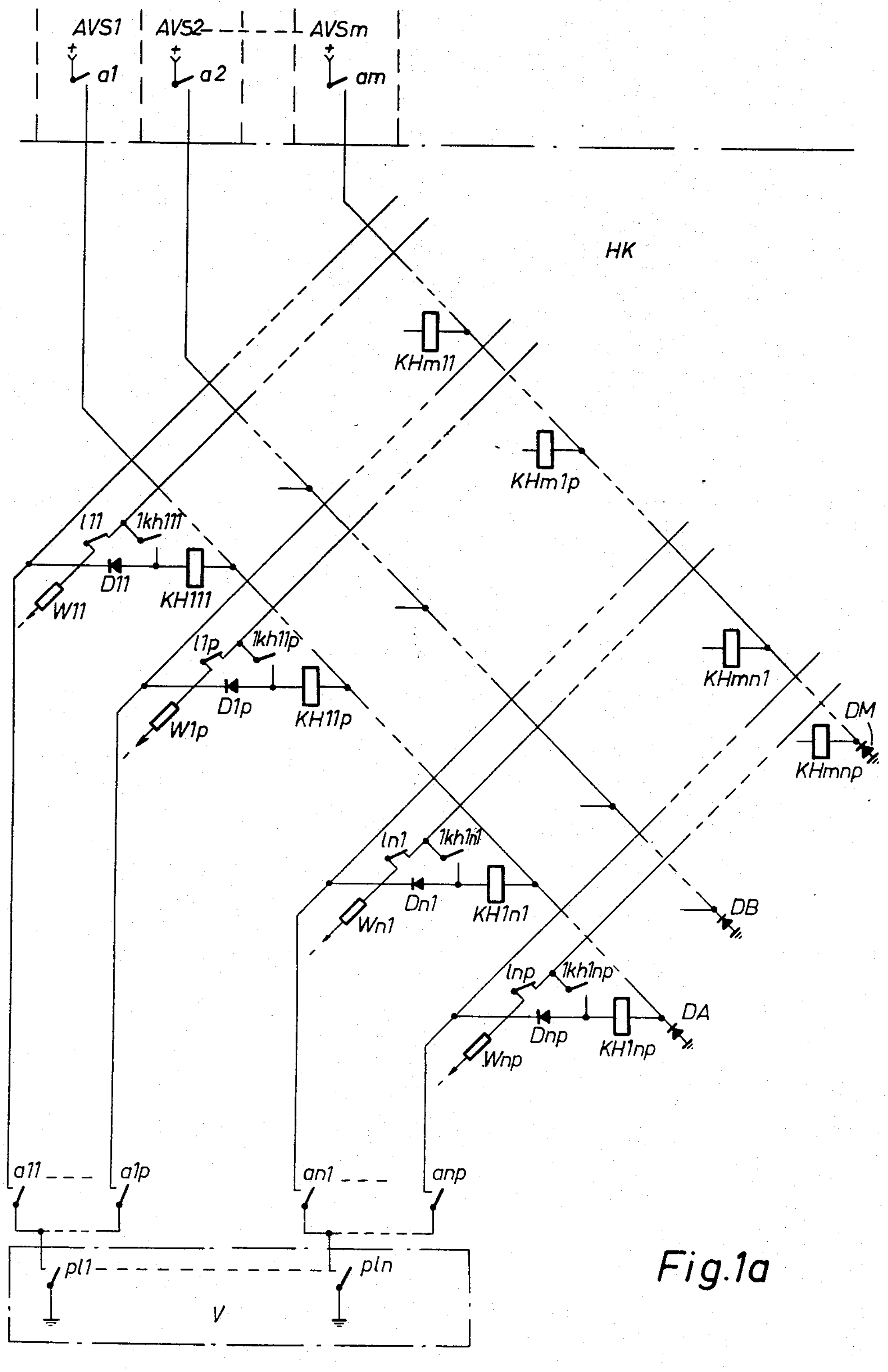

INVENTOR
H. D. SIEBEL-H. SCHLUND

BY

ATTORNEY

ARRANGEMENT FOR CONNECTING EXCHANGE LINES TO SWITCHBOARDS IN TELEPHONE SYSTEMS

This is a continuation of application Ser. No. 110,161 filed Jan. 27, 1971, now abandoned.

The present invention relates to a circuit arrangement for connecting *m* exchange links to *n* switchboards, equipped for console switch loop operation, by means of a relay switching network in private branch exchange telephone systems.

In large PBX systems, the coupling of a certain switchboard is accomplished by means of a switching network consisting of multicontact relays. The great number of contacts required for each relay results from the fact that relatively many wires must be connected through between the exchange link and the switchboard, namely, apart from the speaking wires, signalling wires for transmission of the operating conditions of the exchange trunk, etc.

In PBX systems with switchboards for console direct key operation, the number of crosspoint relays required for the switching network is $m \cdot n$ if there are *m* exchange links and *n* switchboard positions. In systems with console direct key operation, a number of elements, such as line lamp, pilot lamp, busy lamp, speaking key, holdover key, etc., are provided on each switchboard for each exchange trunk, which is the reason why the switchboard has large dimensions and, when the system is extended, must be adapted to each new stage of extension.

In systems with console switch loop operation, the possibility of simultaneously supervising all exchange trunks is dispensed with as a small operator's desk uniform for all stages of extension of the system is used on which usually only the operating condition of the very exchange trunk to be connected is indicated. In such systems, the expenditure on the switching network between exchange links and switchboards is considerably increased. The reasons are the following: First, the number of wires to be connected through becomes greater because the signal wires serving the transmission of the lamp signals must no longer be run directly to the switchboard but via the switching network. Second, each switchboard has more than one, namely *p* interrogating elements, e.g. for holding exchange trunks, in which case it must be possible to reach each exchange link of the group of switchboards from each interrogating element, so that $m \cdot n \cdot p$ crosspoint relays, i.e. *p* times as much as in console direct key operation, are necessary. Third, the groups of switchboards cover more exchange trunks than with console direct key operation (there, the number of exchange links to be attended by each position is restricted by the dimensions of the switchboard). For these reasons, on the one hand, the number of crosspoint relays and, on the other hand, the number of contacts per crosspoint relay are increased.

The invention has for its object to provide a circuit arrangement of the kind mentioned at the beginning whereby the expenditure on the relay switching network is kept within tolerable limits. The invention is characterized in that the switching network has a main matrix with $m \cdot n$ crosspoint relays, each having relatively many contacts, and an auxiliary matrix with $m \cdot n \cdot p$ crosspoint relays, each having relatively few contacts, *p* giving the number of interrogating elements per switchboard via which each exchange link can be reached, that, after the seizure of an exchange link, a selected crosspoint relay of the auxiliary matrix passes the call signal to the selected interrogating element of a switchboard and prepares the operating circuit for the associated crosspoint relay of the main matrix, and that said operating circuit is closed when the speaking key of the selected switchboard, associated with the operated interrogating element, is operated.

Although each position has several interrogating elements, it performs its functions (interrogating, alotting, etc.) simultaneously only via a single element while the other elements are used for holding and supervising operations. This means that the great number of wires which are required for the exchange of signals between the switchboard and the exchange link are only once connected through between the switchboard and the exchange link but not between the interrogating element and the exchange link. Only those wires which are necessary to maintain the assignment between the exchange link and the interrogating element must be connected through for each element.

Another advantage of the invention is the easy convertibility of the switching network between exchange links and switchboards in those switching systems operating with console direct key operation which are to be converted to console switch loop operation, because the existing main matrix must only be supplemented by the auxiliary matrix, which switches the additional wires required for console switch loop operation.

A further object of the invention is to allow, in a PBX telephone system with a relay switching network according to the invention, a connection alotted to a switchboard to be transferred in a simple manner to one or more special switchboards. If an incoming trunk call is answered from a switchbaord position, the operator is sometimes unable to attend on the caller, because, for example, he has no command of the caller's language or cannot give the requested information. At the switchboard, there is usually provided a transfer key, at the operation of which a special call signal is read into the respective exchange link; this call signal alerts a special line finder which couples said exchange links to a special switchboard; the connection between the transferring switchboard and said exchange link is then released.

The invention attains the object of simple transfer in that, when a call interrogated from an ordinary switchboard is transferred to a special switchboard, the crosspoint relay of the auxiliary matrix, associated with the respective exchange link and ordinary switchboard, is released with the operation of a transfer key and the crosspoint relay of the auxiliary matrix, associated with said exchange link and the special switchboard, is marked at the switchboard end, that the connection extending from said exchange link via the main matrix to the ordinary switchboard is first held and said exchange link is marked over a wire of said connection depending on the operation of the transfer key, and that then in the exchange link the marking causes the marked crosspoint relay fo the auxiliary matrix to be operated and the crosspoint relay of the main matrix, associated with said exchange link and ordinary switchboard, to be released.

The invention will now be explained in more detail with reference to embodiments thereof.

Figure 1B:
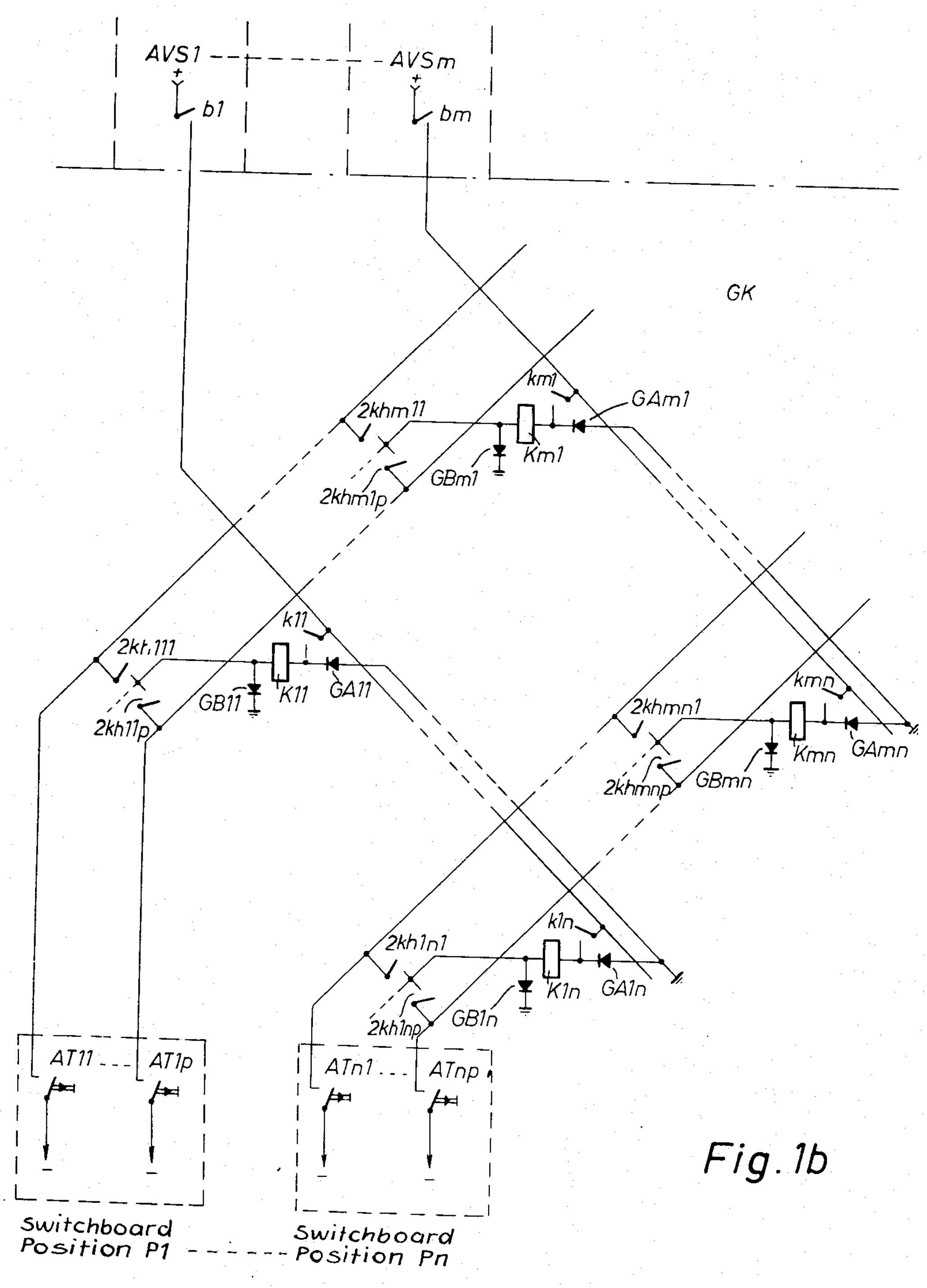

In FIGS. 1*a* and 1*b*, a switching network according to the invention is outlined. FIG. 1*a* shows an auxiliary matrix HK while FIG. 1*b* shows a main matrix GK belonging thereto.

Figure 2A:
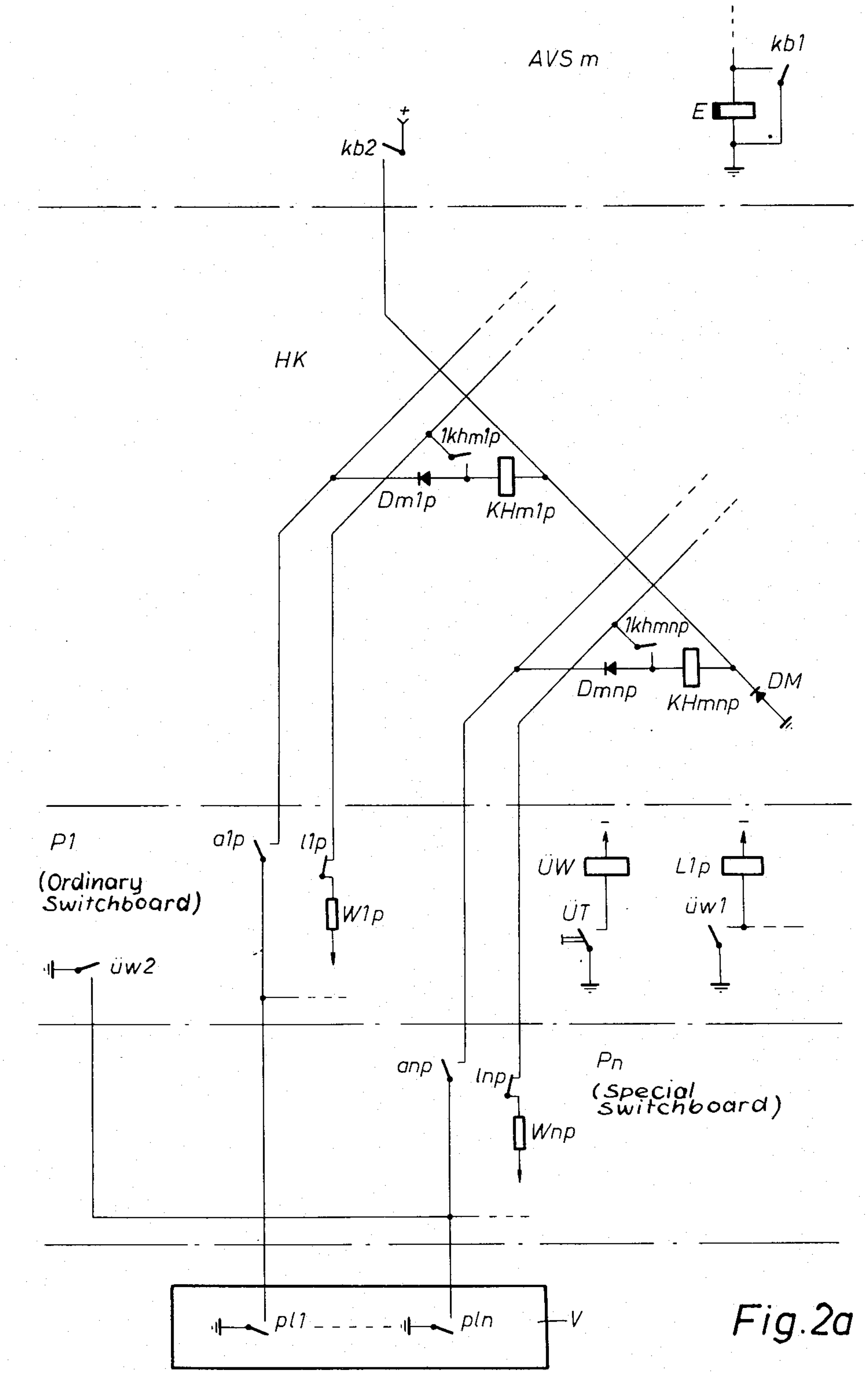
Figure 2B:
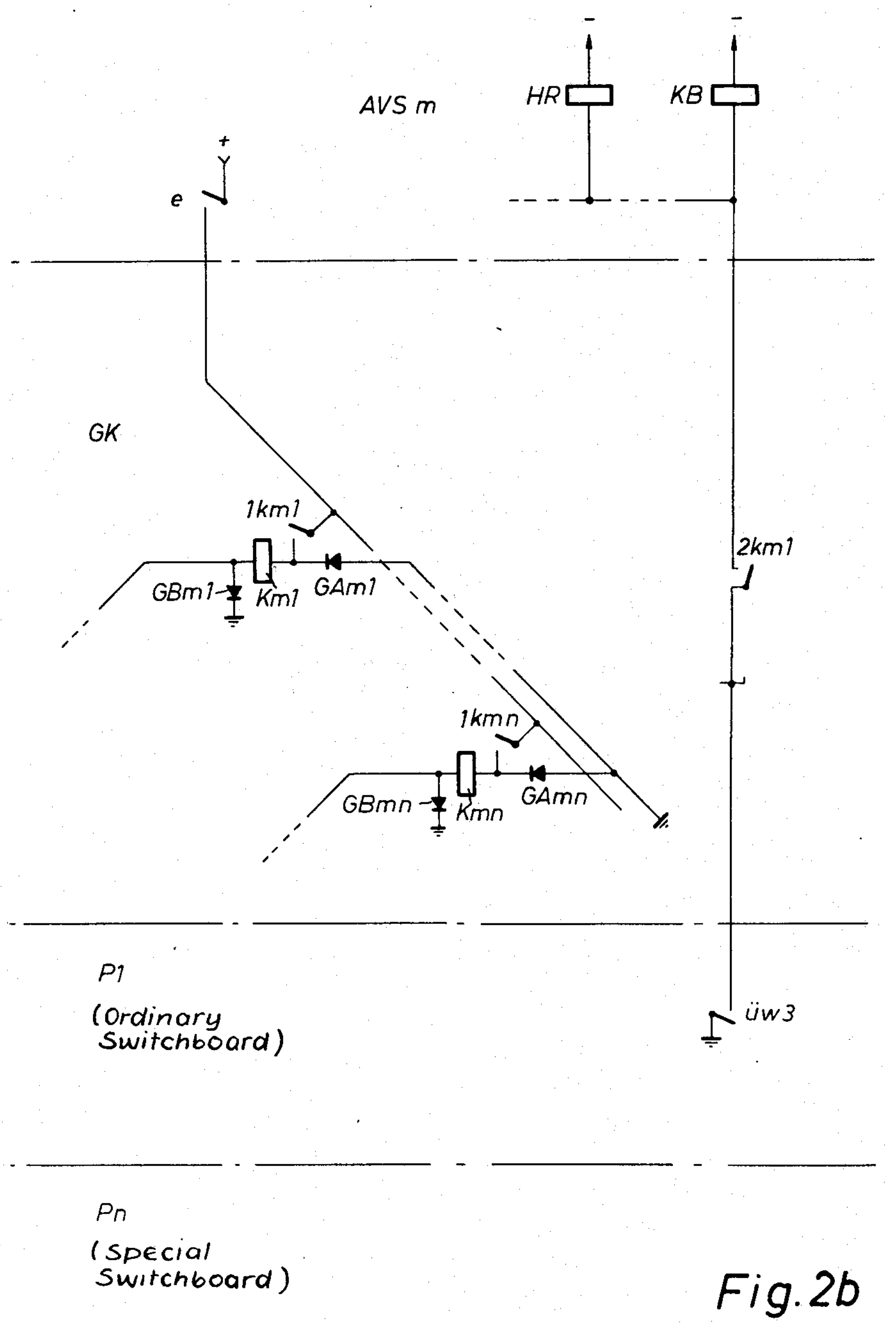

FIGS. 2*a* and 2*b* show additional circuitry for transfer of trunk calls to special switchboards.

The auxiliary matrix HK shown in FIG. 1*a* is a switching matrix with *m* columns and *n* . *p* rows. The column lines of this matrix can be marked by *m* exchange links AVSl...AVS*m* by means of contacts *a*1...*am*, with positive potential being applicable to the column wires. The contacts *a*1...*am* are operated by a line finder only for a short time (line finder not shown) if a call reaches the respective exchange link. Thereby, an auxiliary crosspoint operates and couples the exchange link to the switchboard marked by a call distributor V. The call distributor V can be connected to the row lines by means of contacts $a_{11}...a_{1p}$ to $a_{n1}...a_{np}$. The contacts $a_{11}$.-..$a_{np}$ are controlled by a control equipment not shown. Control, for example, is carried out in such a manner that at each switchboard the contact $a_1$ is normally closed, i.e. all switching connections are applied to the interrogating element 1. Only if an exchange link interrogated on the interrogating element 1 is placed in a holding condition on said interrogating element and said interrogating element is otherwise blocked to new operations does the contact $a_1$ automatically open and the contact $a_2$ close, so that all following operations are handled via the interrogating element 2. Analogous remarks apply if there are more than two interrogating elements per switchboard. In this case, the contacts $a_{11}...a_{1p}$ are connected, on the side of the call distributor, to a common circuit point to which ground potential can be applied in the call distributor via a contact $pl_1$ associated with the first switchboard. In a similar manner, two further 2...*n* groups of row lines each are run to the call distributor V, in which further contacts $pl_2....pl_n$ associated with the switchboards are associated with these groups. Arranged at each crossing point of the column and row wires are crosspoint relays KH111...KH*mnp*, each of which is connected in series with a diode D11...D1*p*...D*n*1...D*np*... . Negative potential can be applied to the common point of connection of the crosspoint relays and the diode via a resistor W11...W*np* common to each row, a reset contact *l*11...*lnp* common to each row and an own contact 1*kh* 111...1*kn*l*np*...of the respective crosspoint relay while the column lines are connected to the ground terminal via diodes DA...DM. There are *m* . *n* . *p* crosspoint relays, each of which are equipped with only few contacts.

The main matrix GK shown in FIG. 1*b* is a switching matrix with *m* columns and *n* rows, with each row having *p* control lines. By the *m* exchange links AVSl...-..AVS*m*, positive holding potential can be applied to the *m* column lines of this matrix by means of contacts *b*1...*bm*. The contacts *b*1...*bm* are closed in a manner not shown when the speaking key is operated; they are closed e.g. as a result of a signal transmitted via the auxiliary matrix. Connected to the row lines are the switchboards P1...P*n*, with *p* row wires running to each switchboard, to which row wires negative potential can be applied via associated keys AT11...A*tlp*, etc., to AT*n*1...AT*np* of the respective switchboard. Shown is the case $p = 2$. Arranged at the crossing of the column lines and row lines of the main matrix are crosspoint relays K11....K*mn*. Through its connection, each crosspoint relay is connected via its own contact *k*11...*kmn* to the associated column line and, via a diode GA11..-.GA*mn*, to the ground terminal, and, through its other connection, it is connected via a diode GB11...GB*mn* to the ground terminal and can be connected via the contacts 2*kh*111...2*khmnp* of the crosspoint relays KH111...KH*mn*1 to the respective row lines connected to the speaking keys. As can be seen from the figures, the crosspoint relays KH11p of the auxiliary matrix HK are associated with the crosspoint relay K11 of the main matrix GK, etc. There are *m* . *n* crosspoint relays in the main matrix GK, each of which is equipped with relatively many contacts.

If a call signal is applied to an exchange link, e.g. the exchange link AVS1, this link is coupled, in known manner, to an idle switchboard, e.g. the switchboard P1, which is marked by the call distributor V. In this example, the operating circuit runs as follows:

$$+, a1, \text{KH}111, \text{D}11, a_{11}, pl_1, \text{ground.} \quad (1)$$

Following the operation of the crosspoint relay KH111, a holding circuit is closed for this relay:

$$+, a1, \text{KH}111, 1kh111, i11, \text{W}11, -. \quad (2)$$

After the opening of the contact *a*1, the holding current is not supplied by the exchange link AVS1 but applied to the relay KH111 via the diode DA.

Each of the crosspoint relays KH 111...KH*mnp* has only few contacts; they connect the call signal wires through to the switchboard and prepare the operation of the associated crosspoint relay in the main matrix GK. The operation itself is not effected until the speaking key is operated. Keeping to the example: Since the contact 2*kh*111 of the crosspoint relay KH111 has been operated, the following operating circuit for the crosspoint relay K11 is closed when the speaking key AT11 is operated:

$$\text{ground, GA}11, \text{K}11, 2kh111, \text{AT}11, -, \quad (3)$$

the diode GB11 being cut off. After the release of the speaking key AT11, this crosspoint relay is held by the exchange link AVS1 in the following circuit:

$$+, b1, k11, \text{K}11, \text{GB}11, \text{ground,} \quad (4)$$

the diode GA11 being cut off.

By operation of the central holding key (not shown), the switchboard can be cleared for another call, the exchange link remaining connected to the interrogating element 1 via the auxiliary matrix while the main matrix releases. At the same time, the contact $a_{11}$ opens while the contact $a_{1p}$ closes, so that the next calling exchange link, when coupled to this switchboard, reaches the interrogating element *p*.

Furthermore, by means of a simple attachment to the PBX telephone system outlined in FIGS. 1*a*, 1*b*, it is possible to mark both an exchange trunk to be transferred and a special switchboard to which exchange links are to be transferred, thus coupling this exchange trunk to the special switchboard. An example thereof is shown in FIGS. 2*a* and 2*b*. In their basic design, the auxiliary matrix HK and the main matrix GK correspond to those shown in FIGS. 1*a*, 1*b*. Also indicated are only the exchange link AVS*m*, the ordinary switchboard P1, the special switchboard P*n* and the call distributor V. Arranged in the exchange link AVS*m* are the calling relay HR and the crosspoint relay KB, which, besides from internal circuit means of the exchange link, can be controlled from the ordinary switchboard P1 via a contact *uw*3 of a transfer relay UW and a contact 2*km*of the crosspoint relay K*m*1. Via a contact *kb*2 of the line finder relay KB, positive potential can be applied to the associated column line of the auxiliary matrix HK while a time-delay relay E can be short-circuited through a contact *kb*1. Via a contact *e* of the relay E, positive potential can be applied to the associated column line of the main matrix GK. The ordinary switchboard P1 is equipped with a transfer key UT, via which the transfer relay UW can be operated. Via a contact *uw*2 of this relay, ground potential can be applied to the common point of connection of the contacts $a_{np}$ . $pl_n$ while a contact *uw*1 of this relay enables a cut-off relay L1*p* of all interrogating elements of its own switchboard to be operated. By means of a reset contact $l_{1p}$ of this cut-off relay, a holding circuit for the crosspoint relay KH*m*1*p*, analogous to the holding circuit (2), can be opened.

If the operator, after interrogating a call connected through by the crosspoint relay KHm1p and the crosspoint relay Km1 to the switchboard P1, operates the transfer key UT, the relay UW and then the relay $L1_p$ operate. By opening the holding circuit for the crosspoint relay KHm1p by means of the contact $l_{1p}$, this crosspoint relay releases. Independent of the call distributor V, the contact *uw*2 marks the row line of the auxiliary matrix HK, associated with the special switchboard P*n*. At first, through the crosspoint relay K*m*1 of the main matrix GK, the connection between the switchboard P1 and the exchange link AVS*m* still exists. Via a signal wire connected through by the crosspoint relay K*m*1, the contact Uw3 causes the relays HR, KB to operate (relay KB had operated previously only for a short time for the purpose of operating the crosspoint relay KH*m*1*p*), with the relay HR applying the calling signal. By means of the contact *kb*2, positive potential is connected to the respective column wire, the following operating circuit thus being completed for the relay KH*mnp*:

+, *kb*2, KH*mnp*, D*mnp*, $a_{np}$, *uw*2, ground. (5)

The relay KH*mnp* operates. By means of the contact kb1, the relay E operated via resistors not shown is short-circuited, so that it becomes deenergized after a certain delay. With the opening of the contact *e*, the crosspoint relay K*m*1 is released. After the release of the transfer key UT, the relay KB becomes deenergized again. The relay E operates again when the special switchboard position answers the line. Thus, the preparations for the holding of the crosspoint relay K*mn* in a circuit analogous to the holding circuit (4) has been made. The crosspoint relay Kmn operates after the speaking key AT*n*1 (FIG. 1b) in the operating circuit (3) has been operated. If the special switchboard Pn is already busy, the operation of the transfer key UT does not result in a transfer to this special switchboard. In addition, the busy condition may be indicated by a lamp at the ordinary switchboard.

Thus, if the operator operates the transfer key, he releases the auxiliary matrix and marks the special switchboard to which the call is to be transferred and which is otherwise marked by the call distributor. Via the respective crosspoint relay of the main matrix, however, he remains connected to the exchange link and marks the latter over a wire of the main matrix. Thus, the exchange link and the special switchboard are marked; both are coupled to each other via the auxiliary matrix. Simultaneously with this coupling operation, the main matrix is released from the exchange link. Thus, the exchange link is now coupled to the special switchboard via the main matrix only, which special switchboard, when interrogating, can then again take advantage of the main matrix.

This arrangement shown in FIGS. 2*a*, 2*b* also allows trunk calls to be transferred to several special switchboards which are operated either through a key in an omnibus circuit or individually through a key for each special switchboard. The processes in the matrices, including the marking of the exchange link to be transferred, are similar to those described.

What is claimed is:

1. A circuit arrangement for connecting *m* exchange links to *n* switchboards, comprising a relay switching network in a telephone system, the switching network including a main matrix and an auxiliary matrix, the main matrix including *m* . *n* crosspoint relays each of which includes a plurality of contacts, the auxiliary matrix including *m* . *n* . *p* crosspoint relays each of which includes a plurality of contacts which is fewer in number than the contacts of the main matrix crosspoint relays, where *p* represents the number of control lines per switchboard position via which each of a plurality of exchange links can be reached, means responsive to seizure of an exchange link to complete a connection between a potential source and ground through a selected crosspoint relay of the auxiliary matrix, said selected crosspoint relay closing a contact preparing an associated crosspoint relay of the main matrix for operation, and means including a speaking key for completing a connection between a potential source and ground to enable operation of said associated crosspoint relay of the main matrix.

2. A circuit arrangement according to claim 1, including transfer means which enable a call answered from an ordinary switchboard among *n* switchboards to be transferred to a special switchboard, the transfer means including a transfer key and switch means associated with the ordinary switchboard for releasing the selected crosspoint relay of the auxiliary matrix and marking the row line of the auxiliary matrix coupled to a special switchboard, whereby the connection extending from said exchange link via the main matrix to the ordinary switchboard is first held and said exchange link is marked over a wire of said connection in accordance with the operation status of the transfer key, and then in the exchange link the marking causes the marked crosspoint relay of the auxiliary matrix to be operated and the crosspoint relay of the main matrix to be released.

* * * * *